United States Patent [19]

Stevens

[11] Patent Number: 4,920,873
[45] Date of Patent: May 1, 1990

[54] STACKABLE CHAFER ASSEMBLY

[75] Inventor: Kenneth V. Stevens, Brooklyn, N.Y.

[73] Assignee: Colgate-Palmolive Company, Piscataway, N.J.

[21] Appl. No.: 319,935

[22] Filed: Mar. 6, 1989

Related U.S. Application Data

[63] Continuation of Ser. No. 81,062, Aug. 3, 1987, abandoned.

[51] Int. Cl.$^5$ .............................................. A47J 27/00
[52] U.S. Cl. ..................................... 99/339; 211/49.1; 126/246; D7/327; D7/355; D7/366; D7/356; D7/403; 99/340; 99/449
[58] Field of Search ................ D7/355, 356, 327, 354, D7/323, 365, 402, 403, 366; 126/246, 261, 265, 43, 369.2, 369, 377; 297/239; 211/49.1, 59.4; 99/339, 340, 416, 449

[56] References Cited

U.S. PATENT DOCUMENTS

| | | | |
|---|---|---|---|
| D. 196,285 | 9/1963 | Farber | D7/365 |
| D. 213,717 | 4/1969 | Rickmeier, Jr. | D7/355 |
| D. 213,899 | 4/1969 | Rickmeier, Jr. | D7/355 |
| 725,335 | 4/1903 | Glaessner | 126/43 |
| 1,246,622 | 11/1917 | Lightfoot | 99/340 |
| 1,474,825 | 11/1923 | Howard | 126/261 |
| 1,545,393 | 7/1925 | Bryant | 126/265 |
| 1,701,989 | 2/1929 | Turner | 126/261 X |
| 3,053,493 | 9/1962 | Stafford | 297/239 |
| 3,195,532 | 7/1965 | Tranberg | 126/246 |
| 3,361,126 | 1/1968 | Bloomfield | D7/355 |
| 3,408,965 | 11/1968 | Hamilton et al. | 297/239 |
| 3,708,202 | 1/1973 | Barecki et al. | 297/239 |

FOREIGN PATENT DOCUMENTS 83916 11/1957 Denmark .......................... 220/85 H

OTHER PUBLICATIONS

"Restaurant Equipment Dealer", photo from back cover.

Primary Examiner—H. C. Hornsby
Assistant Examiner—K. O'Leary
Attorney, Agent, or Firm—Richard J. Ancel; Murray M. Grill; Robert C. Sullivan

[57] ABSTRACT

A stackable, portable chafer assembly comprising a stack of chafter units in which a first lowermost unit has a frame which supports a water pan and the other units of the first unit nest within that pan in compact fashion. The frame of the first unit is designed to support one or more chafter units above it, with the frame of each successively higher unit resting on the frame of the next lower unit, whereby a compact stacked assembly is provided which saves substantially on storage space and which allows the plurality of units to be moved by a single person, avoiding the need to employ one person to move each one of the units.

5 Claims, 4 Drawing Sheets

STACKABLE CHAFER ASSEMBLY

This application is a continuation of application Ser. No. 081,062, filed 8/3/87, now abandoned.

BACKGROUND

Chafers for food service use in restaurants and institutions are typically quite large units and thus use up substantial storage space when not in use. Moreover, to move one such existing unit from storage to the buffet area or kitchen where the food is placed in the unit requires one person to move each unit, which is labor-intensive and therefore expensive.

Thus, current designs are costly because they utilize expensive storage space and expensive labor. While there has, therefore, been a long-felt need for a chafer which functions in the same fashion as prior art designs but which can be converted into a compact assembly for storage and, moreover, wherein such compact assemblies can be stacked for ease of transportation and efficiency during storage, no one skilled in the art has proposed a solution to these important technical and economical problems.

SUMMARY OF THE INVENTION

A chafer is a device for maintaining pre-cooked food warm (or hot) at a location, such as a buffet table, which is remote from the kitchen where the food is cooked.

A chafer typically has a frame and the frame carries a lower water pan, a food pan which contains the food positioned above the water pan and a cover which usually has a handle. The water pan is heated at the serving location by a portable heat source, such as the well-known Sterno ® Brand canned fuel units. These heat sources may be supported by one or more support members attached to the frame.

The present invention is a unique improvement over the prior art chafer designs which cannot be converted into compact size when not in use and which must be moved about one at a time.

Thus, in summary fashion, the present invention provides a new chafer design, whereby the food pan, cover and burner support members (and, if desired, one or more burners) may be nested with the water pan to provide a very compact unit for storage and transportation.

In addition, the frame members are designed so that the units can be stacked vertically, whereby two or more such units form a stacked assembly which may be easily moved by a single person and which, when not in use, utilize a relatively small amount of space, i.e., a space much smaller than the same number of prior art units would occupy.

Accordingly, it is an object of this invention to provide a stackable chafer assembly which is easily transportable and occupies a much smaller space than individual prior art chafers.

It is a further object of this invention to provide a chafer unit which is designed so that the various elements of the chafer nest within the water pan when not in use to form a very compact unit.

Other objects and advantages of this invention will become apparent from the following detailed description, drawings and claims.

THE DRAWINGS

DETAILED DESCRIPTION

Figure 1:
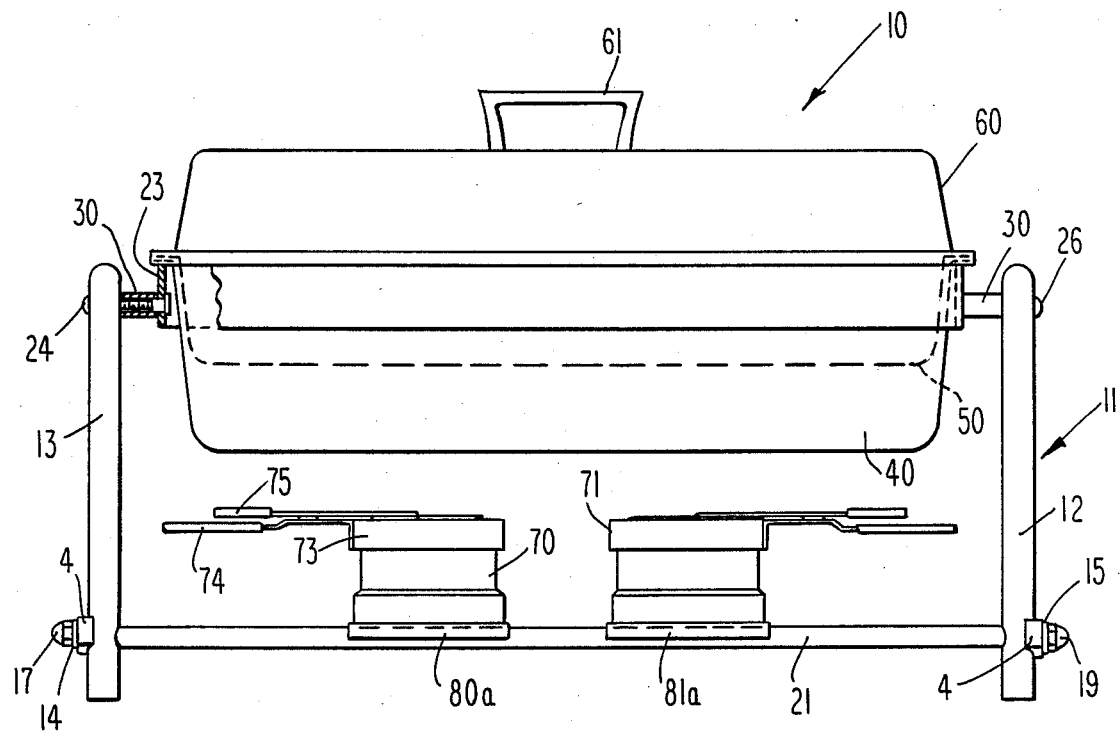
FIG. 1 is a front elevation of a single chafer unit of this invention.
Figure 2:
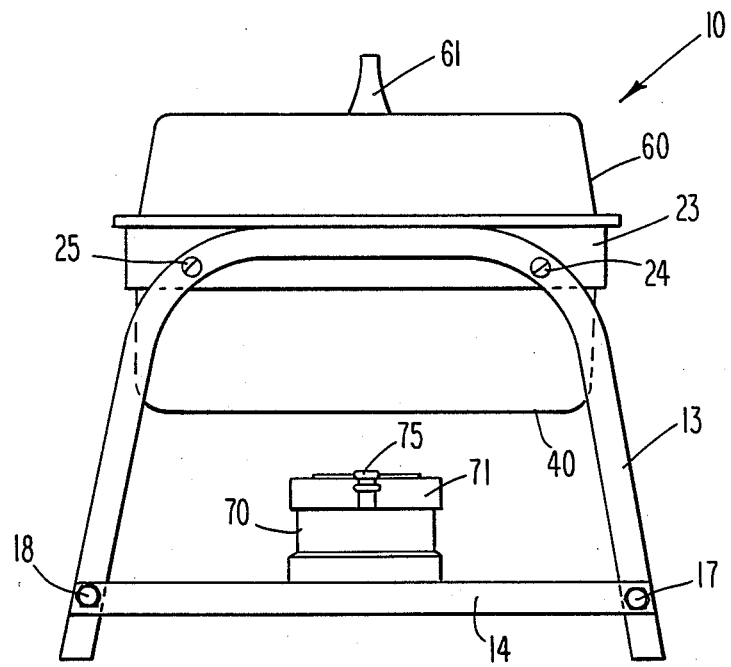
FIG. 2 is an end view of the unit shown in FIG. 1.
Figure 3:
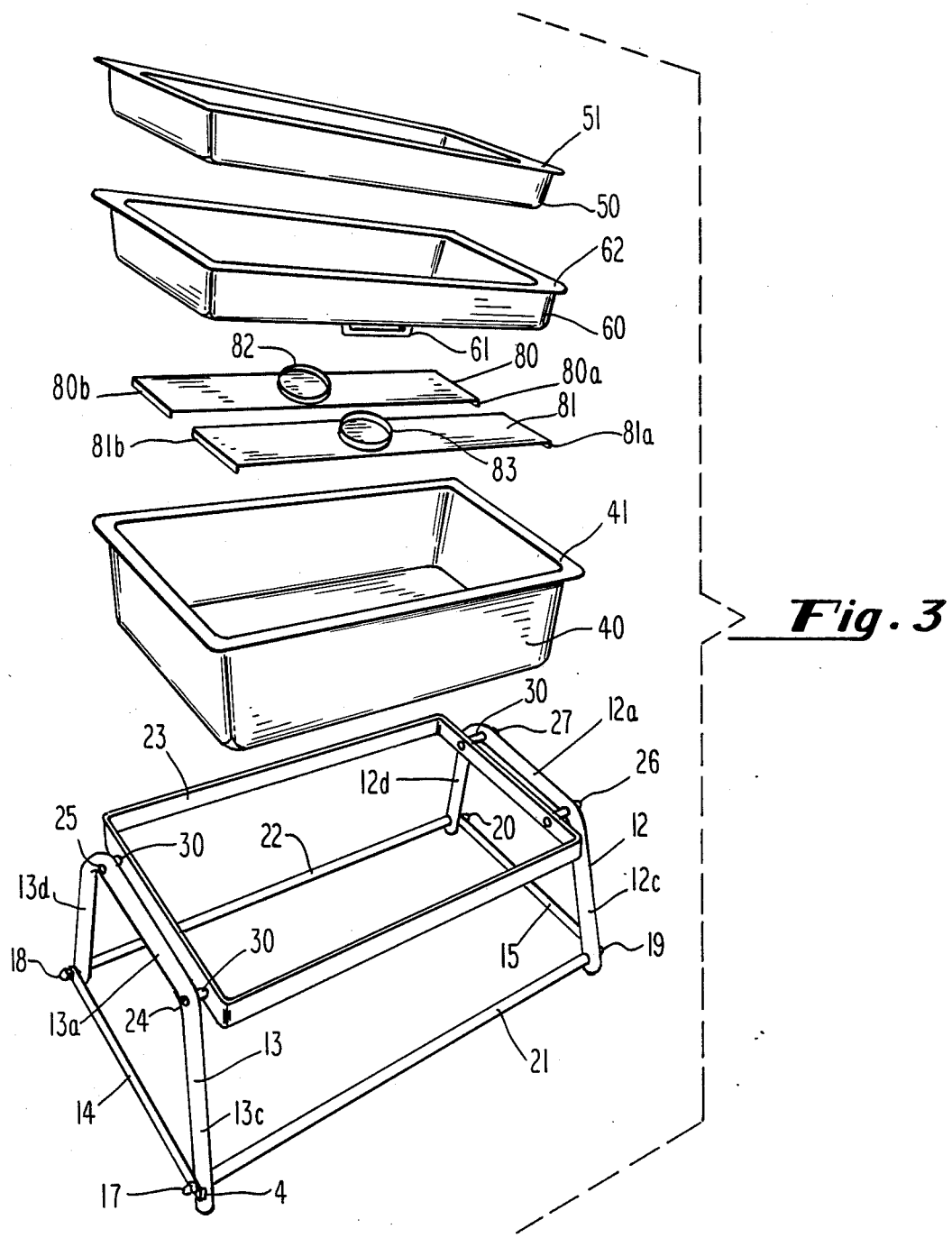
FIG. 3 is an exploded view of the unit of FIG. 1 showing the various components of the unit as arranged for nesting and storage and transportation.

Referring to FIGS. 1, 2, and 3, the single chafer unit is generally designated at 10 and has a support frame 11 which includes tubular end members 12 and 13 (which are preferably square in cross-section, but which may be round as shown in FIGS. 1-5), each of which has an upper portion 12a and 13a, respectively, and depending legs 12c, 12d and 13c, 13d.

Legs 13c and 13d are connected by a bar 14 by bolts 17 and 18. Similarly, legs 12c and 12d are connected by a bar 15 by bolts 19 and 20. The bars 14 and 15 are spaced from their respective legs by spacers 4. The aforesaid bolts pass through the spacers. The frame, as well as the other components of the unit, preferably are metal such as steel or aluminium, but other materials may be used.

A member 21, which may be tubular, receives threaded bolts 17, 19 and serves to connect legs 12c and 13c. Similarly, tubular element 22 connects legs 12d, 13d. Spacers 4 are between the frame members 14 and 15 and the legs of elements 12 and 13.

The frame has an upper frame support 23, preferably (but not necessarily) a unitary member, attached to upper portions 12a and 13a by threaded bolts 24, 25 and 26, 27, respectively. As shown in FIG. 1, bolt 24 passes through a spacer tube 30 which is connected to frame 23, and bolts 25, 26 and 27 are connected to frame 23 in the same fashion. Spacers 30, through which the bolts pass, space tubular end members 13 and 12 from frame member 23. This allows the upper portions 12a and 13a to be used as handles to carry the unit and provides room to permit nested stacking as will be discussed.

As best illustrated in FIGS. 1 and 3, the unit shown in FIGS. 1 and 2 includes a lower water pan 40 which is heated by heat sources within burner cups 70, 72 which, in turn, are positioned by rings 82, 83 of burner support members 80, 81, respectively. The burner cups 70, 72 are part of burner sets and each has a cover 73, 71 and regulator handles 74, 75 and 76, 77. These particular sets are shown for illustration only and other means for providing a source of heat may be employed. Member 80 had depending flanges 80a, 80b which fit over frame members 21, 22 and, similarly, member 81 has flanges 81a, 81b for the same purposes.

As shown in FIG. 1, while in use to maintain pre-cooked food hot, the heat sources contained in burner cups 70, 72 are ignited in position under pan 40 which is filled with water to enhance heat transfer to the food pan in a uniform manner.

Above pan 40 is a food pan 50 which has an upper peripheral flange 51 which rests upon flange 41 of pan 40. The food (not shown) in pan 50 is heated by the hot water in pan 40.

Finally, to maintain the food in a heated condition, the unit has a cover 60 with a handle 61 which the food server uses to remove the cover in order to dispense food from pan 50. Cover 60 has a peripheral flange 62 which rests upon flange 51 of food pan 50 when the unit is in use.

It will be observed from FIGS. 1 and 2 that the unit in use presents a very high profile and, as such, would occupy a great deal of storage space when not in use.

In this invention, however, the various elements in addition to the frame are designed to be of a shape and size so that they can nest within water pan 40 when the unit is not in use.

More particularly, referred to FIG. 3, burner support members 80, 81 are first placed in pan 40 at the bottom. (The burner units are normally stored and transported separately but, if desired, may be placed in pan 40 also).

Then, the cover 60 is inverted so that it rests within pan 40 with the flange 62 supported by flange 41.

Finally, food pan 50 nests within cover 60 with its peripheral flange 51 resting on flange 62.

The nested components form a very compact assembly. Moreover, a plurality of identical (or compatible) units can be placed on top of each other to form a chafer stack assembly for ease of movement and to conserve storage space.

Figure 4:
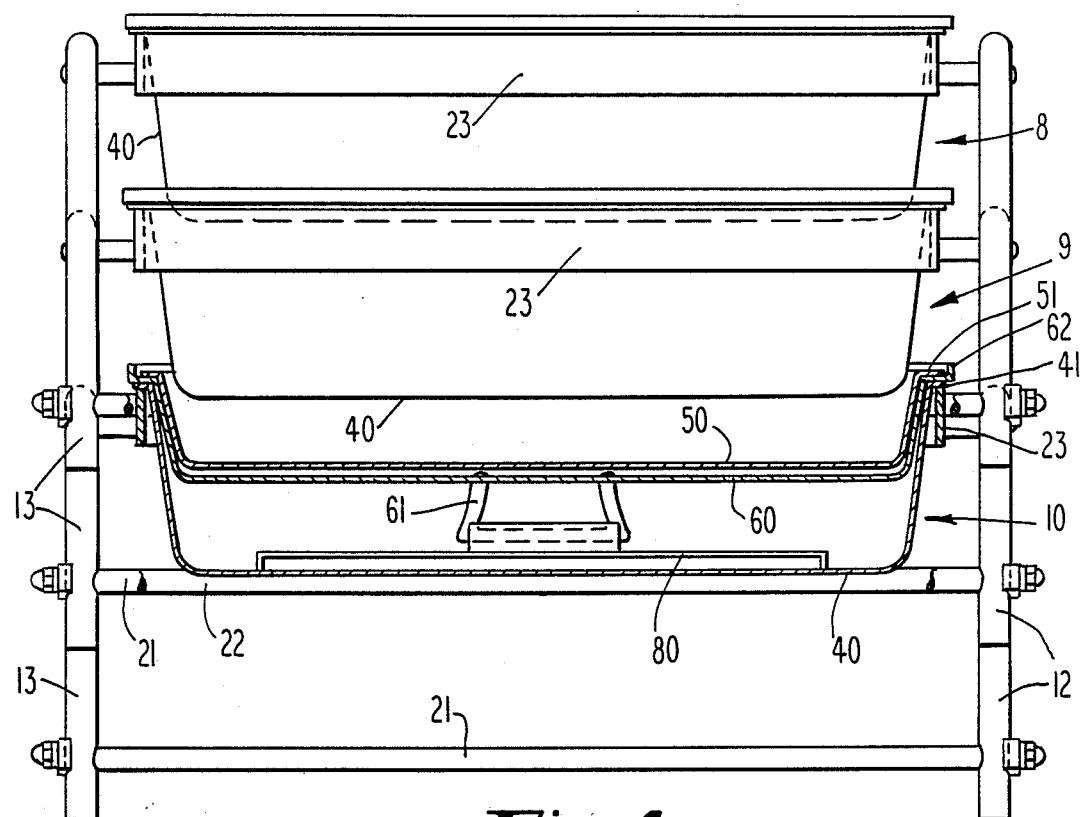
FIG. 4 is a front elevation showing three units of the design shown in FIG. 1 forming a stacked chafer assembly.
Figure 5:
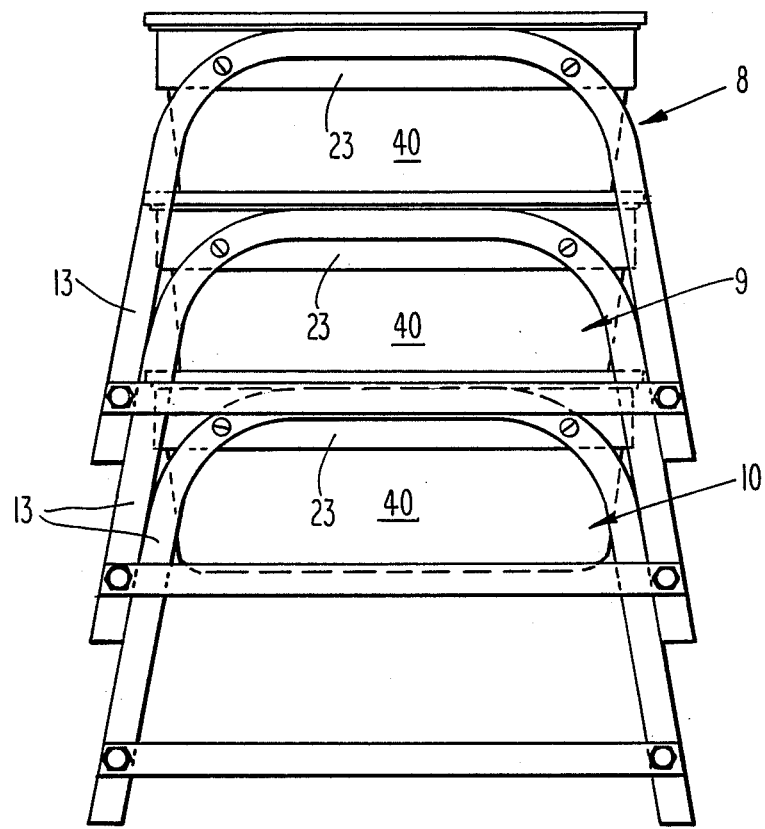
FIG. 5 is an end view of the assembly of FIG. 4.

Thus, FIGS. 4 and 5 illustrate a lower unit 10, the frame of which supports the frame of the next higher unit 9. In turn, the frame of unit 9 supports the frame of a third unit. In this embodiment, units 8, 9 and 10 are of the same design.

With conventional size units, as many as six units or more may be vertically stacked in the above manner.

Figure 6:
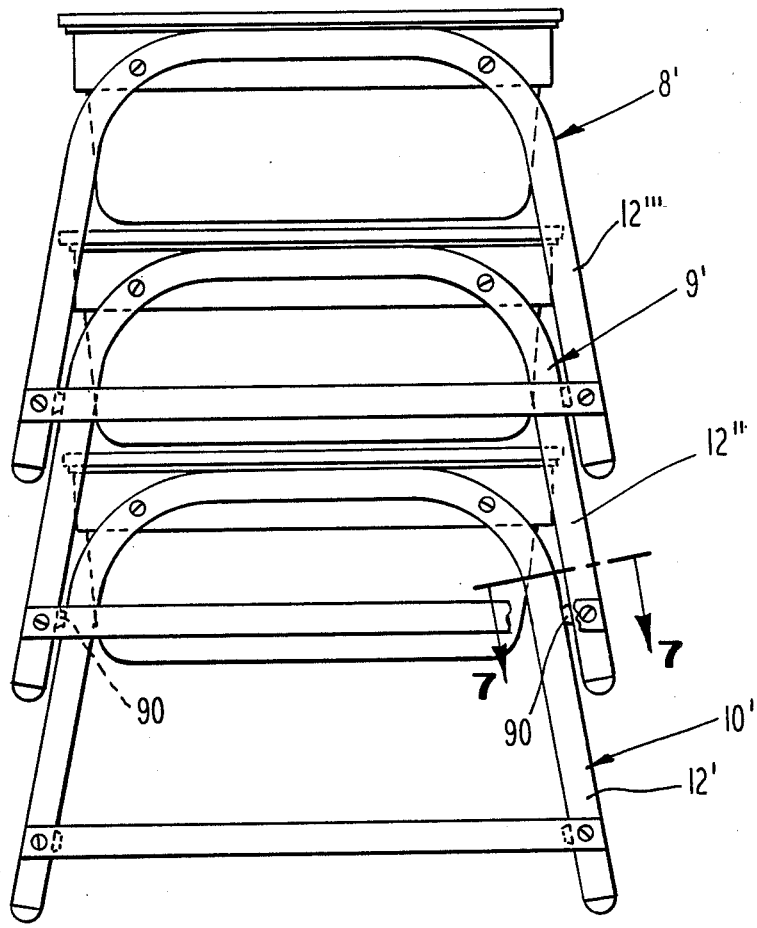
FIG. 6 is a view similar to FIG. 5 of another embodiment of the invention.

FIG. 6 is an end view of another embodiment of the invention wherein three chafer units in the nested mode are stacked. These units have the same components as those shown in FIGS. 1-5 except spacers 90 serve to maintain adjacent frame legs from contact in the stacked position whereby, inter alia, the adjacent legs cannot become frictionally locked together.

Figure 7:
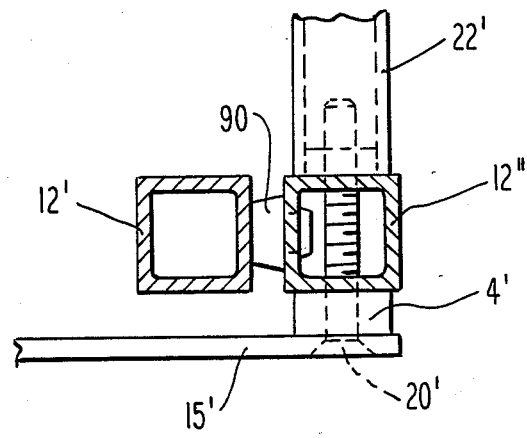
FIG. 7 is a fragmentary section through the legs and spacers along lines 7—7 of FIG. 6.

FIG. 7 is a cross-section showing in greater detail how one spacer 90 is attached to leg 12" (in this embodiment, frame members 12' and 12" and 12''' are square in cross-section) by any suitable means (e.g., by a force-fit through an opening in leg 12") and the spaced relationship thereof to adjacent leg 12'. The spacers 90 may be plastic or other suitable material.

In summary, the unique unit design of the present invention permits compact nesting in the storage mode and, in turn, similar units can be placed in vertical, stacked fashion above the lower unit, thereby conserving space and enabling the assembly of stacked units to be easily transported.

I claim:

1. A modular chafer assembly which comprises:
  a support frame including a pair of end members spaced apart from each other in a longitudinal direction, said end members each including an upper portion and a pair of depending legs which are inclined outwardly in a transverse direction normal to the longitudinal direction such that upper ends of said legs disposed in a vertical direction toward said upper portion of the respective end member are spaced apart transversely by a first width and lower ends thereof are spaced apart transversely by a greater, second width, said support frame also including a lower frame support means connecting said end members in the longitudinal direction for positioning said end members in spaced relation and defining a lower part of a central frame opening therebetween, and upper frame support means connecting said upper portions of said end members in the longitudinal direction and defining an upper part of the central frame opening therebetween, said central frame opening being defined by said upper and lower frame supports in the vertical direction and by said end members in the longitudinal direction;
  a water pan having a first peripheral flange and a first depth extending downwardly in the vertical direction from said first peripheral flange, said water pan being dimensioned for housing within said upper part of the central frame opening defined in said support frame, said first peripheral flange being supported on said upper frame support means with said first depth of said water pan extending into said upper part of the central frame opening;
  a food pan having a second peripheral flange and a depth in the vertical direction which is less than said first depth of said water pan, said food pan being dimensioned for nesting within said water pan, said second peripheral flange resting on said first peripheral flange;
  a cover having a third peripheral flange which rests on said second peripheral flange of said food pan and a height in the vertical direction which is less than said first depth of said water pan; and
  heat source support means for supporting a heat source removably mounted on said support frame, said food pan, cover, and heat source support means being dimensioned for nesting arrangement within said water pan when said chafer assembly is disassembled to provide a compact, stackable unit, and said support frame and nesting arrangement of said water pan of said chafer assembly thereby being stackable on another chafer assembly of a similar configuration by the second width of said lower ends of said inclined legs of said end members of the chafer assembly being nested over the first width of said upper ends of said inclined legs of the end members of the other chafer assembly at an intermediate height between the upper and lower ends of the other chafer assembly in the vertical direction, and by the nesting arrangement of the water pan of the other chafer assembly being housed within the lower part of the central frame opening of said first-mentioned chafer assembly which allows sufficient clearance for said first depth of said water pan of said first-mentioned chafer assembly to be stacked above the water pan of the other chafer assembly.

2. A modular chafer assembly according to claim 1, wherein said upper frame support means includes a member which is attached to and spaced inwardly from said upper portions, said member defining a water pan receiving opening.

3. A modular chafer assembly according to claim 1, wherein said lower frame support means includes a pair of longitudinally extending frame members connected to the lower ends of the respective legs of said end members on each transverse side of said central frame opening, and said heat source support means includes a panel which is supported by said support members of said lower frame support means, said panel having a pair of terminal end flanges which engage the respective support members of said lower frame support means.

4. A modular chafer assembly according to claim 1, further comprising spacer means for spacing the support frames of stacked and nested chafer assemblies from direct frictional contact with one another.

5. A modular chafer assembly according to claim 4, wherein said spacer means includes a spacer member attached to each of said depending legs.

* * * * *